(12) United States Patent
Curtin

(10) Patent No.: US 10,832,279 B2
(45) Date of Patent: Nov. 10, 2020

(54) AGGREGATION OF UNIQUE USER INVOCATIONS IN AN ONLINE ENVIRONMENT

(71) Applicant: International Business Machines Corporation, Armonk, NY (US)

(72) Inventor: Christopher M. Curtin, Acworth, GA (US)

(73) Assignee: International Business Machines Corporation, Armonk, NY (US)

(*) Notice: Subject to any disclaimer, the term of this patent is extended or adjusted under 35 U.S.C. 154(b) by 861 days.

(21) Appl. No.: 15/238,984

(22) Filed: Aug. 17, 2016

(65) Prior Publication Data

US 2018/0053209 A1     Feb. 22, 2018

(51) Int. Cl.
*G06Q 30/02*     (2012.01)
*G06F 16/22*     (2019.01)
*G06F 16/9535*   (2019.01)

(52) U.S. Cl.
CPC ..... *G06Q 30/0246* (2013.01); *G06F 16/2255* (2019.01); *G06F 16/9535* (2019.01); *G06Q 30/0257* (2013.01)

(58) Field of Classification Search
CPC ............ G06Q 30/0246; G06Q 30/0257; G06F 16/2255; G06F 16/9535
USPC ............. 705/14.45; 707/783, 721; 709/14.45
See application file for complete search history.

(56) References Cited

U.S. PATENT DOCUMENTS

| | | | |
|---|---|---|---|
| 8,065,184 B2 | 11/2011 | Wright et al. | |
| 8,849,838 B2* | 9/2014 | Wang | G06F 16/90335 707/754 |
| 9,165,305 B1 | 10/2015 | Chandra et al. | |
| 9,357,023 B2 | 5/2016 | Glommen et al. | |
| 2005/0033803 A1 | 2/2005 | Vleet et al. | |
| 2012/0254200 A1 | 10/2012 | Lifshitz et al. | |
| 2014/0149433 A1 | 5/2014 | Lakshminarayan et al. | |
| 2014/0222888 A1 | 8/2014 | Karidi | |
| 2015/0150075 A1* | 5/2015 | Vahlis | G06F 21/602 726/1 |

(Continued)

FOREIGN PATENT DOCUMENTS

KR     20100003093 A  *  1/2010
WO     2004/066180 A1    8/2004

OTHER PUBLICATIONS

Sebastian Frischbier, Aggregation for implicit invocations, 2010 (Year: 2010).*

(Continued)

*Primary Examiner* — Tarek Elchanti
(74) *Attorney, Agent, or Firm* — Stephanie Carusillo; Hunter E. Webb; Keohane & D'Alessandro, PLLC

(57) ABSTRACT

Methods and systems for determining a unique invocation of an online feature are disclosed. A key is distributed to multiple users. Upon performing a user action, the key is sent to a Bloom filter. If the output of the Bloom filter is a negative activation, the invocation is deemed to be unique. If the output of the Bloom filter is a positive activation, the invocation is deemed to be non-unique. For a large data set, the computational overhead of processing the key with the Bloom filter is significantly less than the brute force database approach. Thus, in large systems with many millions of users and possible user actions, disclosed embodiments allow assessment of a unique action in a timely manner.

20 Claims, 9 Drawing Sheets

(56) References Cited

U.S. PATENT DOCUMENTS

2015/0154640 A1    6/2015   Qiao et al.
2015/0341455 A1   11/2015   Qu et al.
2016/0164757 A1    6/2016   Pape

OTHER PUBLICATIONS

Einziger et al., "Counting with TinyTable: Every Bit Counts!", ICDCN '16, Jan. 4-7, 2016, Singapore, Copyright 2016 ACM, 10 pages.
Fajardo et al., "DTN—Based Data Aggregation for Timely Information Collection in Disaster Areas", 2012 IEEE 8th International Conferernce on Wireless and Mobile Computing, Networking and Communications (WiMob), Copyright 2012 IEEE, pp. 333-340.

\* cited by examiner

AGGREGATION OF UNIQUE USER INVOCATIONS IN AN ONLINE ENVIRONMENT

FIELD OF THE INVENTION

The present invention relates generally to e-commerce, and more particularly, to aggregation of unique user invocations in an online environment.

BACKGROUND

Many online systems exist today that allow a user to purchase items. In addition, many online transactions also involve purchase of services such as software subscriptions. In addition, online systems are often used in marketing campaigns. Electronic communication with systems such as email and text messaging allows marketing campaign designers and e-commerce operators to communicate with users, sending promotional messages, product information, and advertisements for related goods and services. Marketing and e-commerce continue to be a major component of the promotion and sale of goods and services.

SUMMARY

In one aspect, embodiments provide a computer-implemented method for determining a unique invocation of an online feature, comprising: distributing a key to a plurality of users; creating a Bloom filter configured to receive the key that identifies user utilization of the online feature; and using the Bloom filter to probabilistically determine a subset of users included in the plurality of users that have utilized the online feature based on a negative activation of the Bloom filter in response to the key.

In another aspect, embodiments provide a system for determining a unique invocation of an online feature, comprising: a Bloom filter server, the Bloom filter server comprising: a processor; a memory coupled to the processor, wherein the memory contains instructions, that when executed by the processor, perform the steps of: distributing a key to a plurality of users; creating a Bloom filter configured to receive the key that identifies user utilization of the online feature; and using the Bloom filter to probabilistically determine a subset of users included in the plurality of users that have utilized the online feature based on a negative activation of the Bloom filter in response to the key.

In yet another aspect, embodiments provide a computer program product for determining a unique invocation of an online feature on an electronic device, comprising a computer readable storage medium having program instructions embodied therewith, the program instructions executable by a processor to cause the electronic device to: distribute a key to a plurality of users; create a Bloom filter configured to receive the key that identifies user utilization of the online feature; and utilize the Bloom filter to probabilistically determine a subset of users included in the plurality of users that have utilized the online feature based on a negative activation of the Bloom filter in response to the key.

BRIEF DESCRIPTION OF THE DRAWINGS

Features of the disclosed embodiments will be more readily understood from the following detailed description of the various aspects of the invention taken in conjunction with the accompanying drawings.

Figure 1:
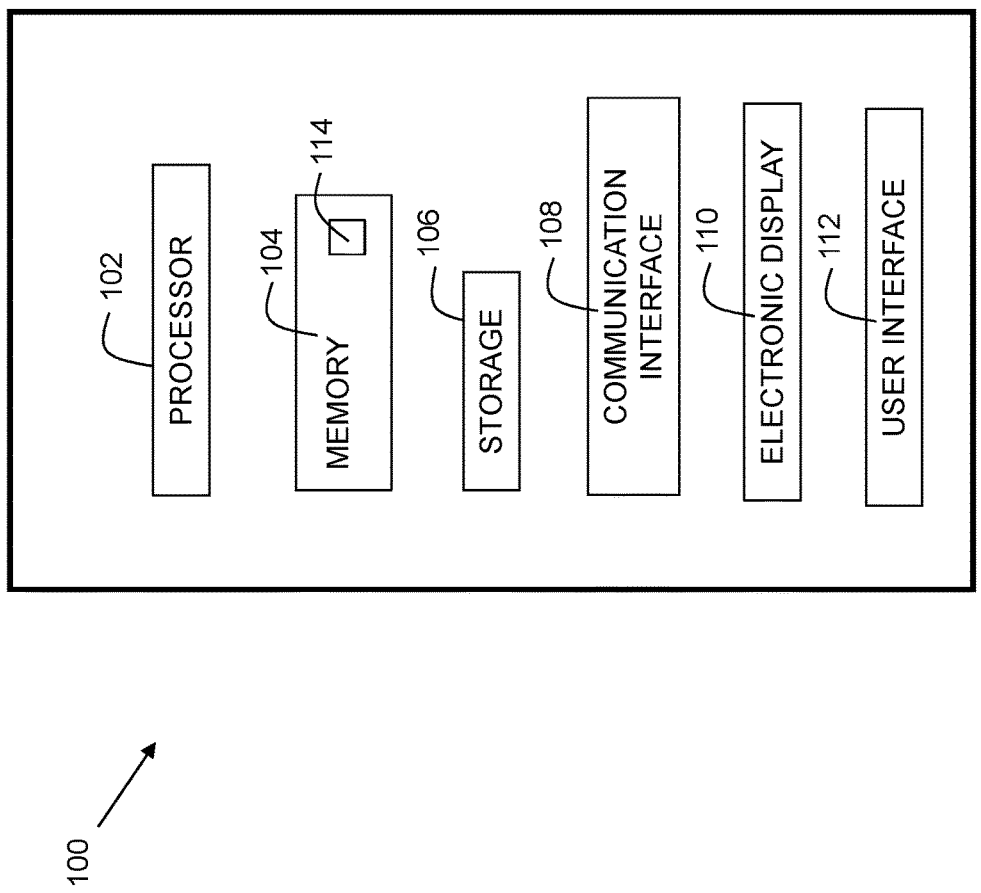
FIG. 1 is a block diagram of a client device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

In embodiments, a Bloom filter is used to determine a unique invocation of an online feature. A key is distributed to multiple users. Upon performing a user action, the key is sent to a Bloom filter. The key is associated with a particular user and user action, and thus identifies user utilization of the online feature. If the output of the Bloom filter is a negative activation, the invocation is deemed to be unique. If the output of the Bloom filter is a positive activation, the invocation is deemed to be non-unique. For a large data set, the computational overhead of processing the key with the Bloom filter is significantly less than the brute force database approach. Thus, in large systems with many millions of users and possible user actions, disclosed embodiments allow assessment of a unique action in a timely manner. The user actions may include, but are not limited to, selecting a link on a website, selecting a link in a mobile application, opening a mobile application, performing an action in a mobile application, selecting a link on a website, downloading a document from a website or server, making a purchase, downloading a document from a website, and/or selecting a link within an email message. The mobile application may be an "app" that is executed on a device such as a smartphone or tablet device.

The assessment of uniqueness of a user action provides valuable insight for business, marketing, and other e-commerce activities. For example, an advertising campaign can send a marketing email to 10 million users. The email can contain a link to coupons, offers, and/or a website associated with a product or service. While knowing how many total accesses to the website has some use as an e-commerce statistic, it does not provide insight into how many different users accessed the site. Thus, a subset of users, each accessing the website multiple times, can hide the true effectiveness of the advertising campaign, since the total count is inflated beyond the number of true users. The count of unique users to visit the website provides a more valuable metric of campaign effectiveness. For very large systems with many users and many possible actions, searching a database to determine if a particular user has previously performed an action can be prohibitively time-consuming. However, embodiments of the present invention address this problem by utilizing a Bloom filter for a quick determination of uniqueness, thereby providing valuable information for very large scale marketing/advertising campaigns. In embodiments, the number of users ranges from 10 million users to 100 million users.

FIG. 1 is a block diagram of a device 100 in accordance with embodiments of the present invention. Device 100 includes a processor 102. The processor 102 may include one or more processing cores. Device 100 further includes memory 104. The memory 104 is coupled to the processor such that instructions stored in memory 104 can be executed by the processor 102 to implement aspects of disclosed embodiments. The memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Instructions 114 may reside in memory 104. Instructions 114 may comprise one or more modules configured to perform tasks and/or steps for carrying out embodiments of the present invention. In some embodiments, the modules may be software modules. Device 100 may further include additional storage 106. Additional storage 106 may include, but is not limited to, solid state storage such as SRAM, Flash, and/or magnetic or optical storage. Device 100 further includes a communication interface 108. The communication interface 108 includes a near field communication transceiver, and may support a variety of protocols, including, but not limited to, WiFi, Bluetooth™, Ethernet, TCP/IP, UDP, and/or other protocols and/or standards for communication. In embodiments, the communication interface 108 includes a Bluetooth™ transceiver. Device 100 further includes an electronic display 110. The electronic display 110 may include a liquid crystal display (LCD), a plasma display, a cathode ray tube (CRT) display, a light emitting diode (LED) display, an organic LED (OLED) display, or other suitable display technology. Device 100 further includes a user interface 112. In some embodiments, user interface 112 may be a touch screen, and in some embodiments, may include a capacitive and/or resistive touch screen, or other suitable interface. The user interface 112 may provide a mechanism for a user to enter text into an application.

Figure 2:
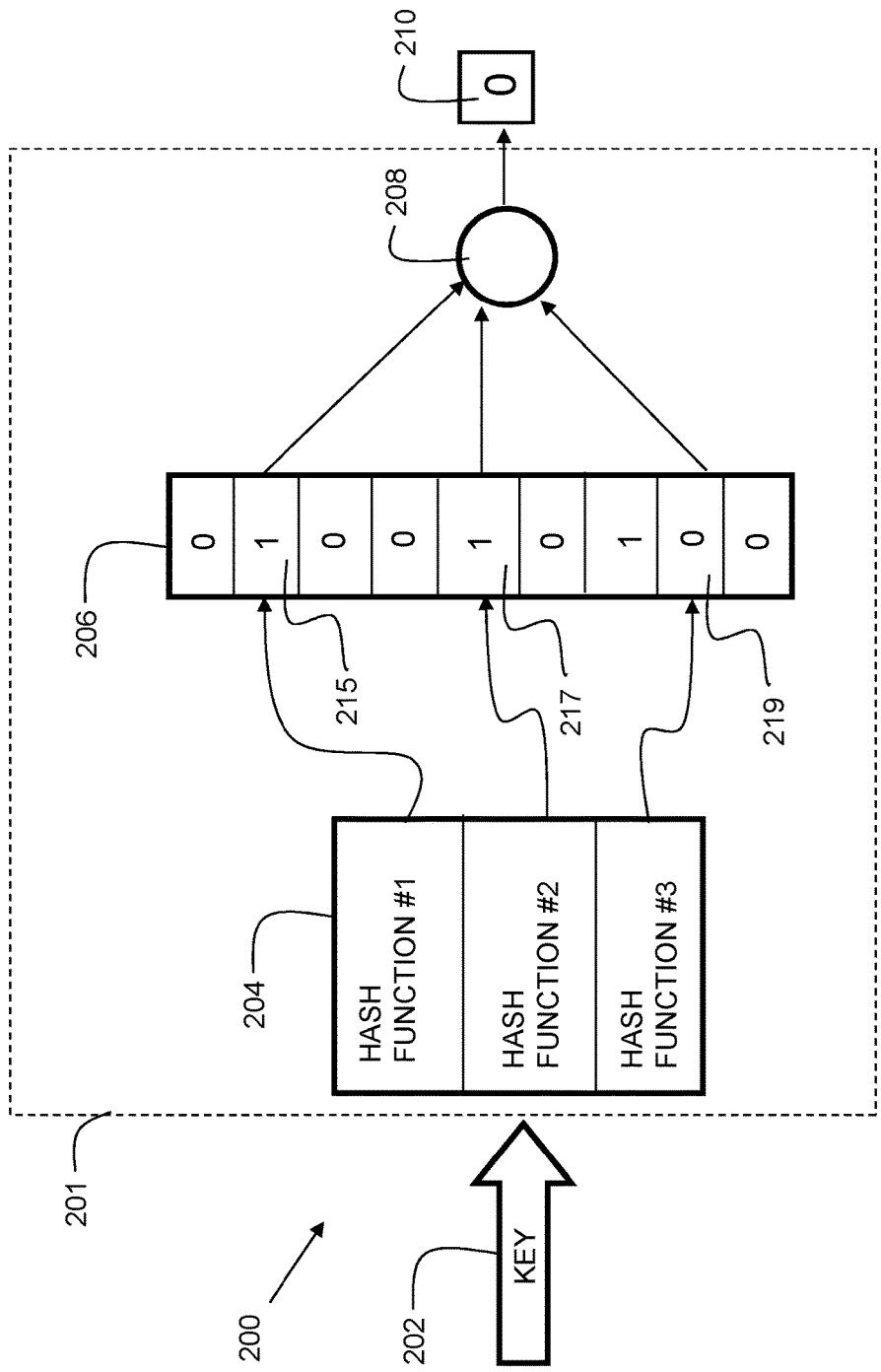
FIG. 2 is a diagram showing negative activation of a Bloom filter.

FIG. 2 is a diagram 200 showing negative activation of a Bloom filter. A Bloom filter is a space-efficient probabilistic data structure that can be used to test membership. A key 202 is sent to Bloom filter 201. In embodiments, the key is an alphanumeric string. Internal to Bloom filter 201 is hash module 204. Hash module 204 hashes the key 202 with multiple hash functions. As shown in FIG. 2, there are three hash functions. In embodiments, there may be more or fewer hash functions within the hash module 204. In some embodiments, the hash functions include a Foler-N-Vull (FNV) hash function, a Jenkins hash function, and/or a Pearson hash function. In some embodiments, one or more of the hash functions within hash module 204 may use the same algorithm, but may be seeded with different initial values by appending a different seed value to the key for each hash function. In some embodiments, each hash function in hash module 204 may be the same algorithm and use the same input value, but output different sections of the output value for the result. For example, if the hash function used returns a 128 bit value, then hash function #1 may return the lowest 32 bits of the value, hash function #2 may return the next 32 bits, and so on.

The hash output of each function is represented as a bit in memory array 206. In the example shown, memory array 206 comprises 9 bits, representing 9 possible hash values. In practice, memory array 206 may contain many millions or billions of bits. To determine uniqueness, the current value in each corresponding location is compared. The values are logically ANDed by AND gate 208, and the output value 210 reflects the activation status of the Bloom filter 201. In this example, the bit value 215 corresponding to hash function #1 is a logical 1, the bit value 217 corresponding to hash function #2 is a logical 1, and the bit value 219 corresponding to hash function #3 is a logical 0. Thus, the output value 210 is a 0, and the Bloom filter returns a negative activation, indicating that the key 202 has not previously been sent to the Bloom filter 201. The bit value 219 corresponding to hash function #3 is then set to 1. This will cause a subsequent presentation of key 202 to cause a positive activation of Bloom filter 201.

Figure 3:
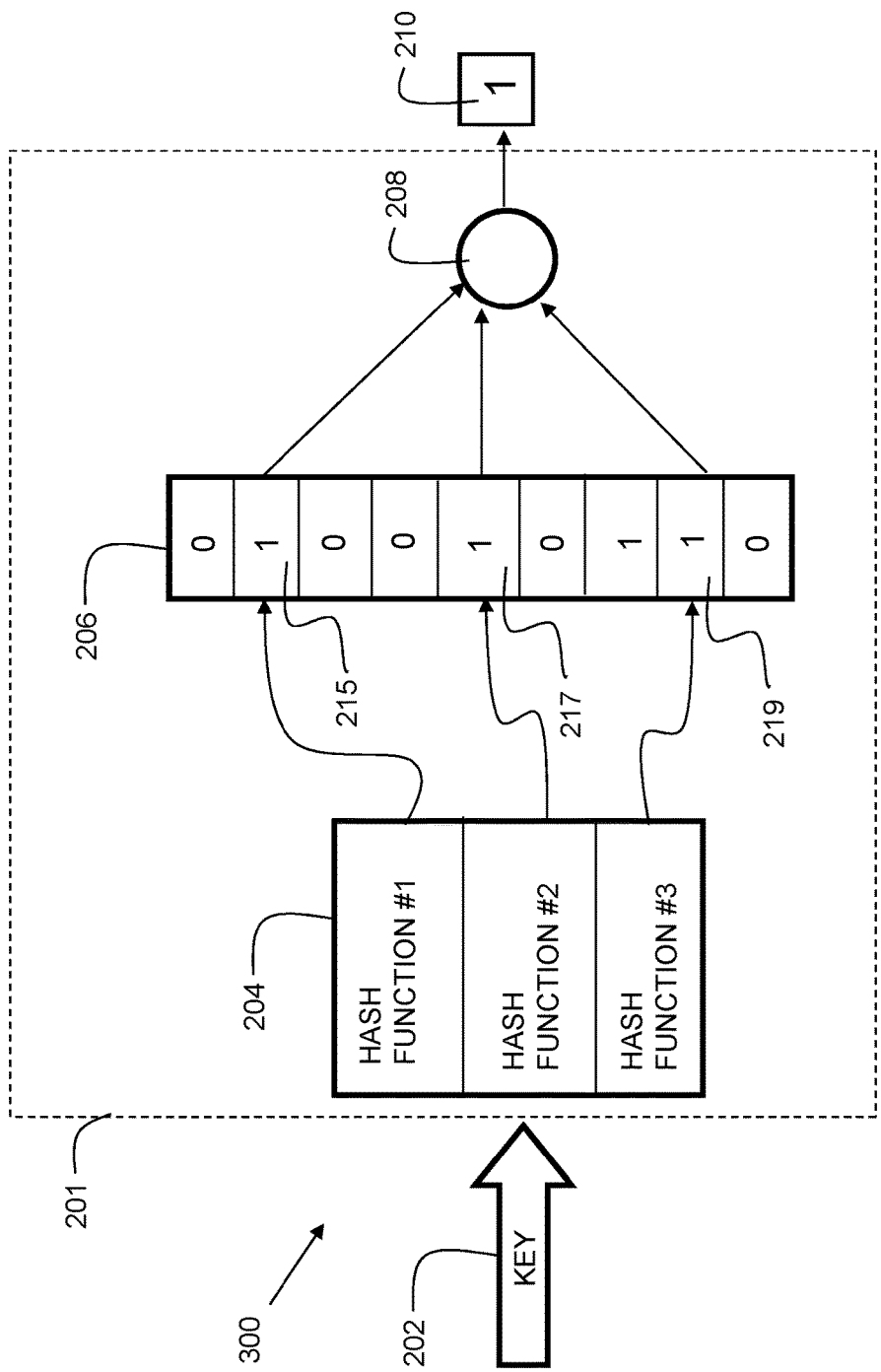
FIG. 3 is a diagram showing positive activation of a Bloom filter.

FIG. 3 is a diagram 300 showing positive activation of the Bloom filter 201. Continuing the example from FIG. 2, the key 202 is sent to the Bloom filter 201 a second time. This can happen if the same user performs an action (e.g., clicks on a link in an email) twice. FIG. 3 shows the positive activation that occurs on the second time performing the action. Since the user has previously performed this action, the second invocation is a non-unique invocation. This time, bit value 219 has a logical 1 stored in it prior to the arrival of the key 202. Now, the bit value 215 corresponding to hash function #1 is a logical 1, the bit value 217 corresponding to hash function #2 is a logical 1, and the bit value 219 corresponding to hash function #3 is also a logical 1. Thus, all three bit values are a logical 1, and the output value 210 is a logical 1, meaning that the Bloom filter returns a positive activation, indicating that the key 202 has previously been sent to the Bloom filter 201. Thus, the activation status of the Bloom filter as positive or negative provides an indication of the uniqueness of a user action.

The number of hash functions k represents a Bloom function parameter. As an example, in FIG. 2 and FIG. 3, k is 3, since there are three hash functions in hash module 204. A Bloom filter does not return false negatives. Thus, if a Bloom filter indicates a unique action, then the action is in fact unique. A Bloom filter may return a false positive. With appropriate design of the Bloom filter, the probability of a false positive is relatively low. Thus, embodiments use the Bloom filter to probabilistically determine a subset of users included in the plurality of users that have utilized the online feature based on a negative activation of the Bloom filter in response to the key. The value selected for k, the size of the memory array, the number of keys that have been inserted into the Bloom filter, and the size of the data set (number of users and actions) are all factors that can affect the false positive rate. In general, a non-zero false positive rate is acceptable for assessing uniqueness in a large scale system. If a false positive occurs, it causes a unique action to be erroneously counted as a non-unique action. With a very large data set, a reasonable false-positive result can still provide meaningful results for campaign designers that can be used to gauge the effectiveness of a campaign. In embodiments, the value of k and the size of the memory array can be selected to achieve a desired false positive rate. For example, if a false positive rate of 0.1% is desired, then a Bloom filter can be created with an appropriate value for k and an appropriately sized memory array, in order to achieve that false positive rate. A variety of software packages and libraries exist for performing this calculation. In embodiments, the Orestes-Bloom filter library is used to create an appropriately sized Bloom filter for the desired false positive rate. As more keys are added to the Bloom filter, the false-positive rate increases as bit values increasingly get converted to a logical 1. Thus, in embodiments, periodically, a new Bloom filter is created. Disclosed embodiments may include associating a Bloom filter duration with an online feature duration. For example, an email marketing campaign may be sent weekly to announce product specials. A Bloom filter duration corresponding to the duration of the marketing campaign results in a new Bloom filter being created for each week's campaign. By associating a Bloom filter duration with an online feature duration, the false-positive rate is reset to its initial minimal value with each new Bloom filter.

Figure 4:
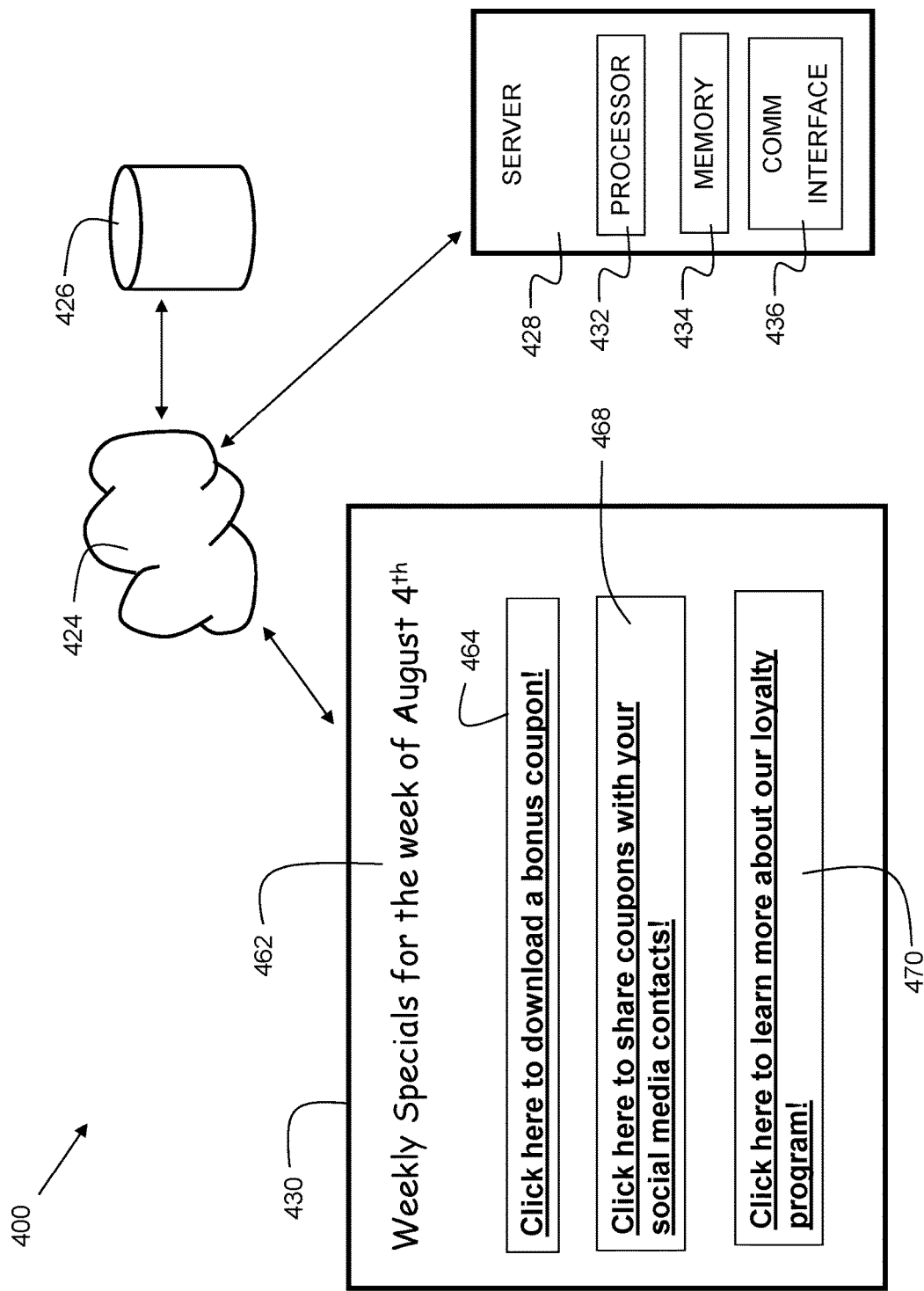
FIG. 4 is a system diagram of an embodiment of the present invention.

FIG. 4 is a system diagram 400 of an embodiment of the present invention. A server 428 and client device 430 are in communication over network 424. In embodiments, server 428 is an electronic device that serves as a Bloom filter server. In embodiments, the server 428 implements a Bloom filter that returns an activation status based on a key input to the Bloom filter, wherein the key is associated with a user action. The server 428 may include a processor 432, a memory 434, and communications interface 436. In embodiments, network 424 may be the Internet, a local area network (LAN), wide area network (WAN), cellular network, cloud network, or another suitable network. The system may further include an additional server 426. In embodiments, the additional server 426 stores documents that may be downloaded by a user. Embodiments can efficiently track downloads by unique users by utilizing the Bloom filter server 428.

In an example implementation, the device 430 is presenting an email message 462 to a user. The email message 462 contains three individual links, indicated as 464, 468, and 470. Each link has a unique link key associated with it. An email message similar to message 462 may be sent to multiple users. Each user may have his own user key (unique for each user) that is concatenated with the link key to form a compound key. The compound key is thus unique for every possible combination of user and user action. Upon selecting (clicking) a link, the compound key is sent to the Bloom filter for a uniqueness determination. In embodiments, a script is invoked for each link selection. The script can create and/or send the compound key to server 428. In embodiments, the script may be implemented using a scripting language such as PHP, Java, and/or JavaScript. Each action has a unique compound key. If the compound key causes a negative activation of the Bloom filter, then the user action associated with that compound key has not previously been performed, and hence is representative of a unique invocation.

Figure 5:
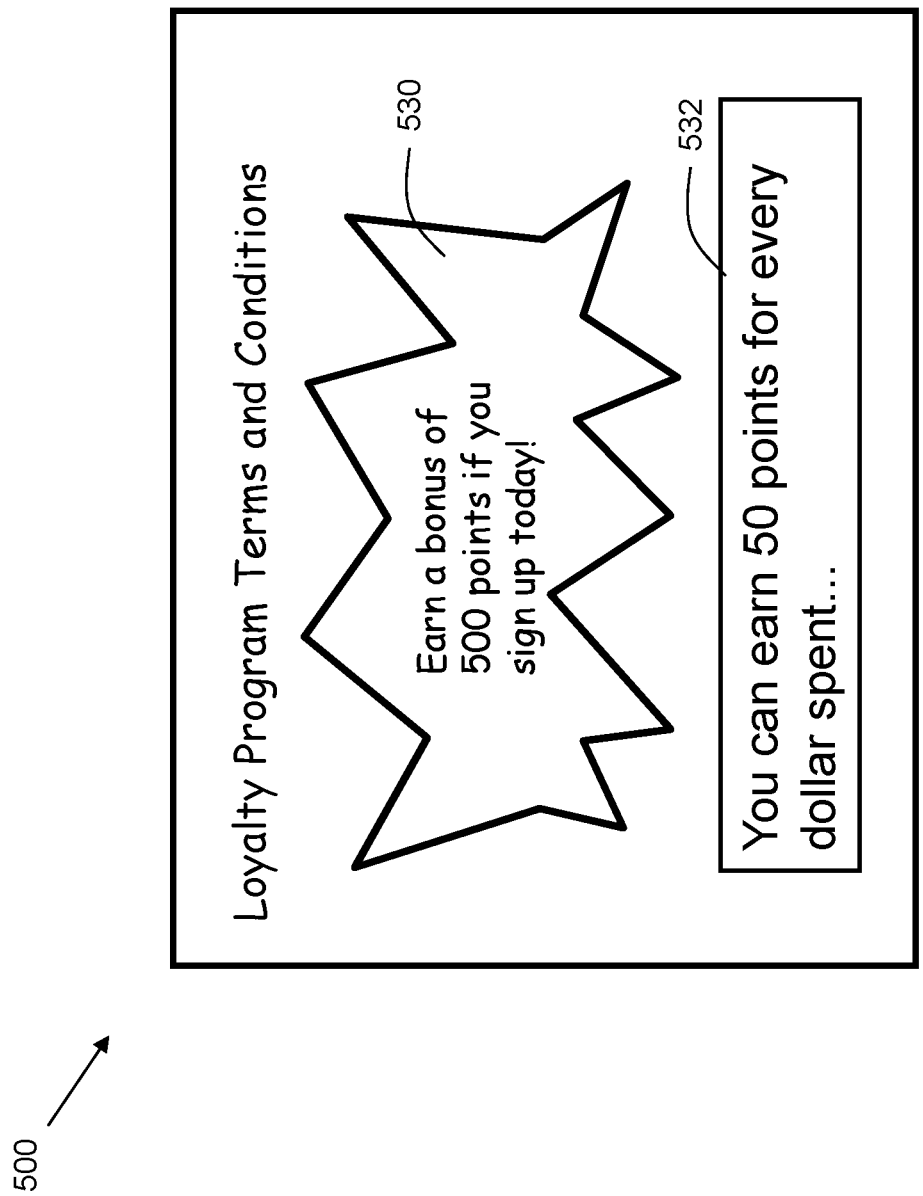
FIG. 5 shows an exemplary unique invocation message in accordance with embodiments of the present invention.

FIG. 5 shows an exemplary unique invocation message 500 in accordance with embodiments of the present invention. For example, supposing a user, for the first time, clicked on link 470 of FIG. 4, and then a unique invocation message such as message 500 of FIG. 5 may be rendered on the client. The message 500 comprises a first statement 530 and a second statement 532. These statements provide details of conditions for a loyalty program.

Figure 6:
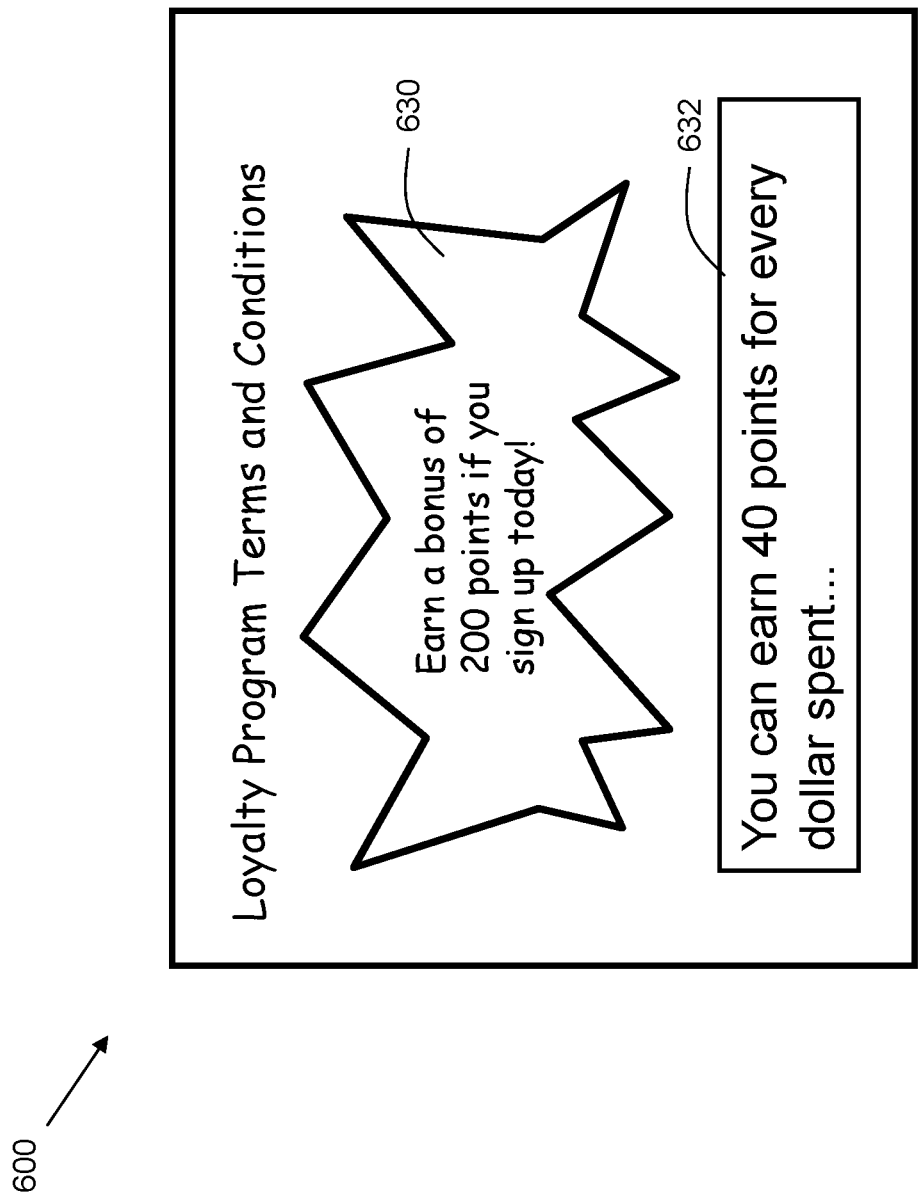
FIG. 6 shows an exemplary non-unique invocation message in accordance with embodiments of the present invention.

FIG. 6 shows an exemplary non-unique invocation message 600 in accordance with embodiments of the present invention. For example, supposing a user, for a subsequent time (not the first time), clicked on link 470 of FIG. 4, then a non-unique invocation message such as message 600 of FIG. 6 may be rendered on the client. The message 600 comprises a first statement 630 and a second statement 632. These statements provide details of conditions for a loyalty program that differ from the conditions shown in message 500 of FIG. 5. Thus, embodiments of the present invention provide a campaign administrator the capability to change a message that gets sent to a user based on first-time invocation status. In the example shown, the user can earn a different point bonus depending on whether they have clicked on link 470 previously or not. Thus, embodiments include sending a first message to a plurality of users based on a negative activation of the Bloom filter in response to the key, and sending a second message to a plurality of users based on a positive activation of the Bloom filter in response to the key.

Figure 7:
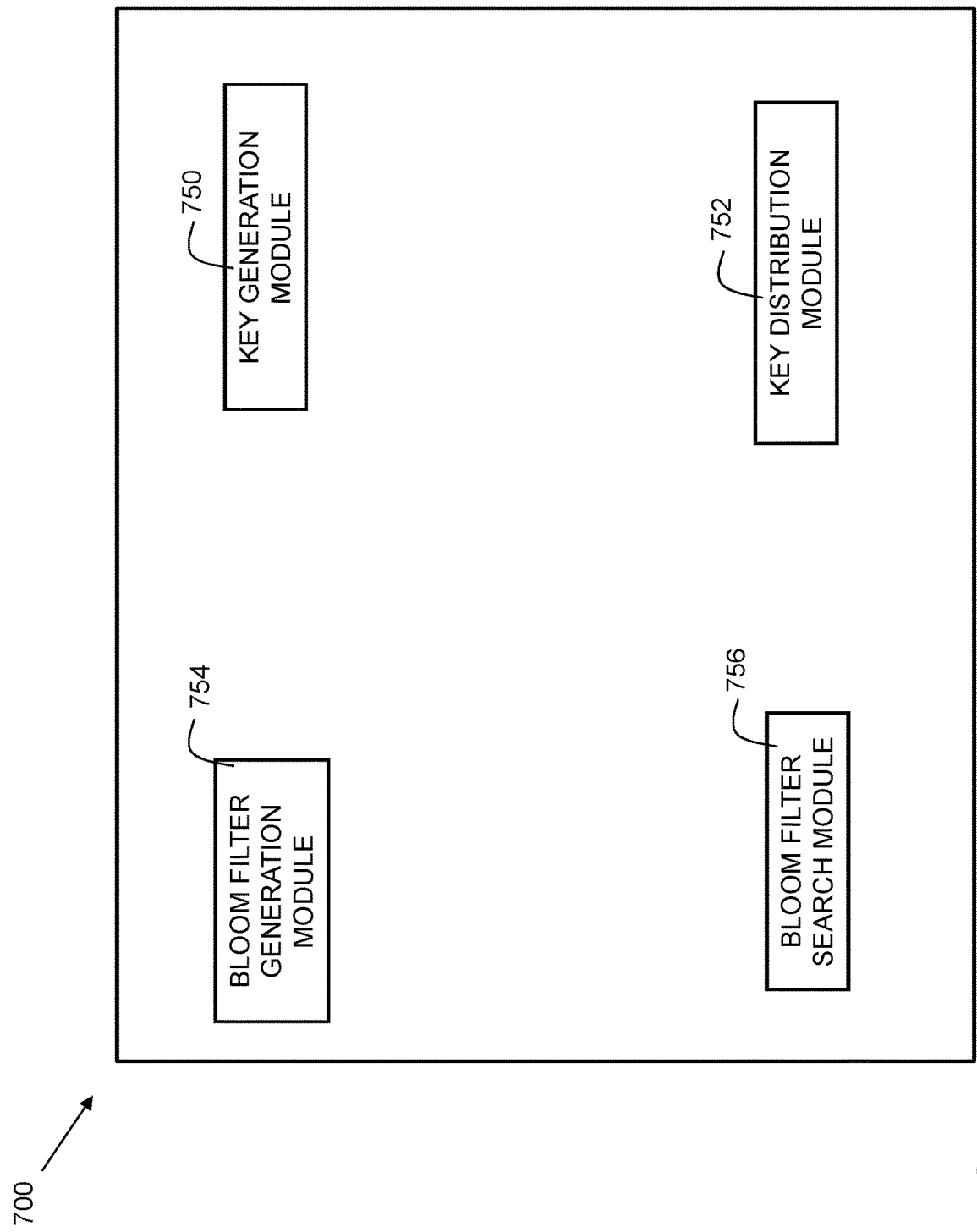
FIG. 7 is a block diagram of modules in accordance with embodiments of the present invention.

FIG. 7 is a block diagram 700 of modules in accordance with embodiments of the present invention. Module 750 is a key generation module. In embodiments, the key generation module generates keys that are unique amongst all users and possible user actions. In embodiments, the keys can include binary data, and/or alphanumeric strings. The Bloom filter generation module 754 comprises software and/or hardware to select a Bloom filter with the parameters for achieving a desired false-positive rate. In embodiments, the Bloom filter generation module 754 includes an Orestes Bloom filter library. The Bloom filter search module 756 comprises instructions for providing a key to the Bloom filter and receiving a corresponding activation result for that key. The key distribution module 752 associates keys generated by key generation module 750 with user actions such as selecting links, opening applications, downloading documents, and the like. The key distribution module 752 distributes the keys to users and/or servers associated with user actions, such that when the user performs an action, the key is sent to the Bloom filter search module 756.

Figure 8:
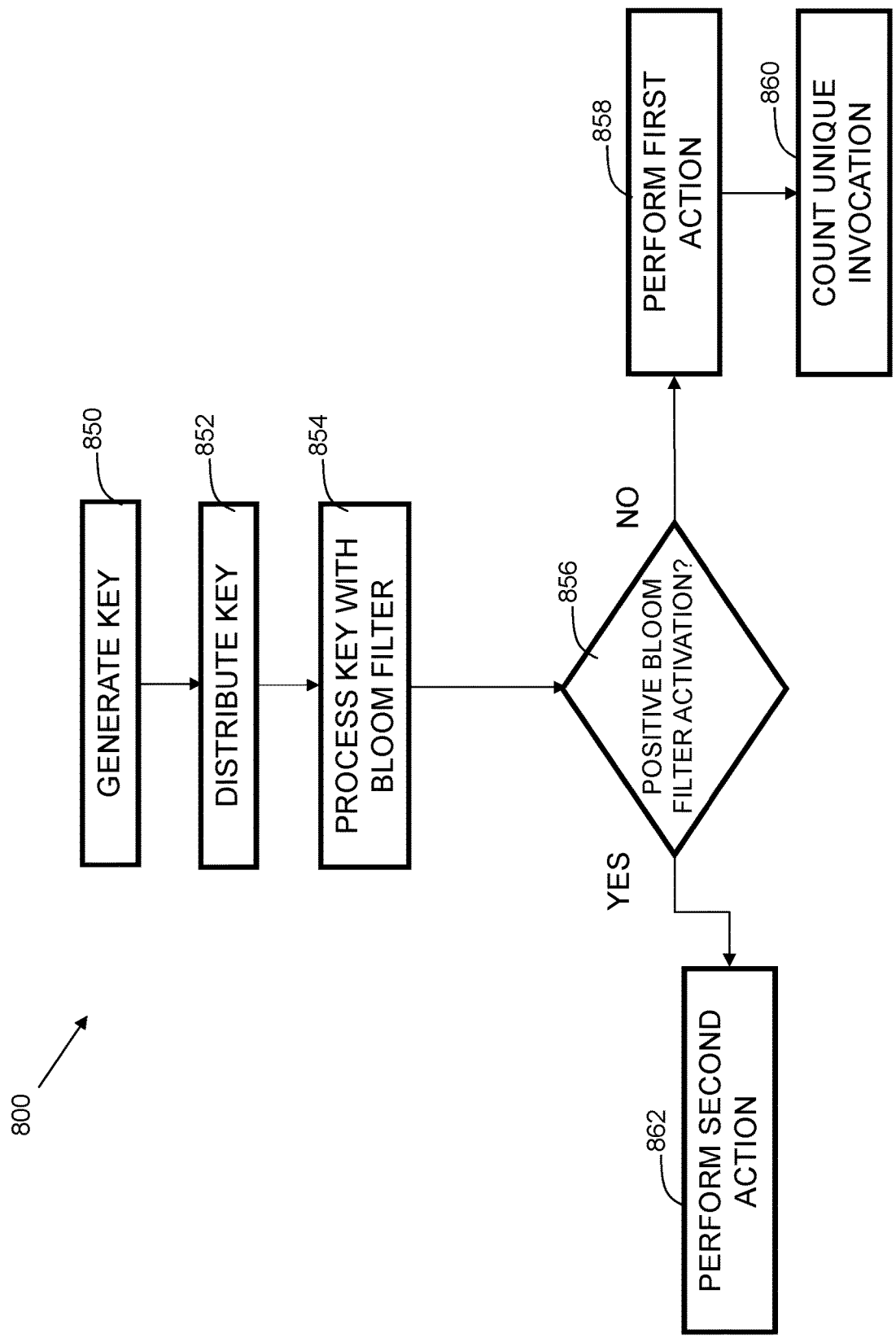
FIG. 8 is a flowchart indicating process steps for embodiments of the present invention.

FIG. 8 is a flowchart 800 indicating process steps for embodiments of the present invention. In process step 850, a key is generated. In process step 852, the key is distributed to and/or associated with a user and/or user action. In process step 854, the key is processed by the Bloom filter. In process step 856, a check is made for a positive Bloom filter activation. If no, then a first action is performed at process step 858. The first action can include sending a first message to the user. The flow then continues with counting a unique invocation at process step 860. If, at 856, there is a positive Bloom filter activation, then the flow continues to performing a second action at process step 862. The second action can include sending a second message to the user, wherein the second message is different than the first message.

Figure 9:
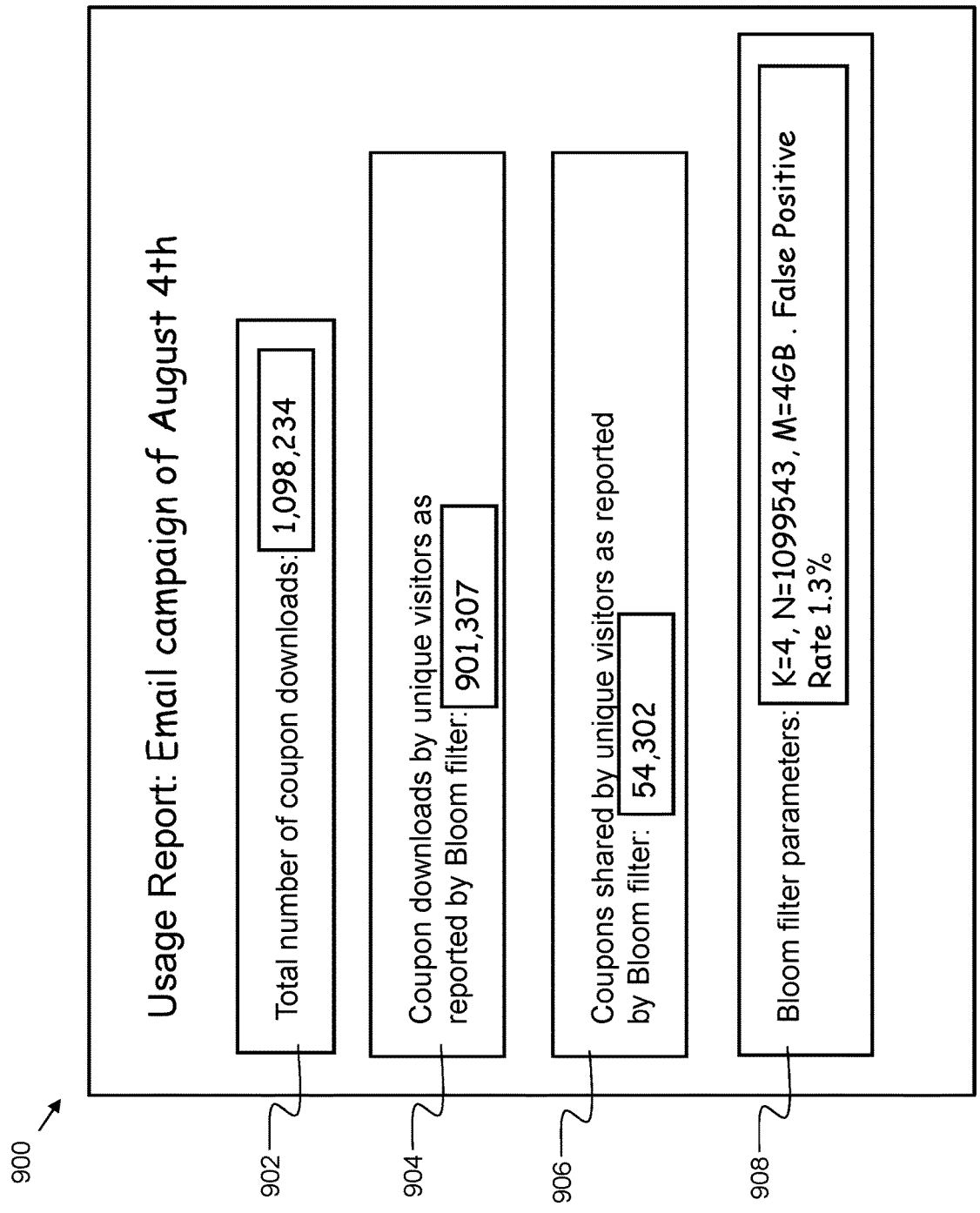
FIG. 9 is an exemplary report in accordance with embodiments of the present invention.

FIG. 9 is an exemplary report 900 in accordance with embodiments of the present invention. Field 902 shows a total number of coupon downloads. Field 904 shows a number of coupon downloads by unique visitors. Field 906 shows a number of coupons shared by unique visitors. Field 908 shows Bloom filter parameters, such as K, N (number of keys loaded) and M (total number of bits in the memory array), as well as a false-positive rate, based on the values of K, N, and M. Thus, embodiments may include recording a count of unique invocations, and creating a report including the count of unique invocations As can now be appreciated, embodiments of the present invention provide an improved system and method for determining a unique action of a user in an e-commerce environment. Embodiments allow the uniqueness determination on a very large scale with millions of users. The determination is made utilizing a Bloom filter. With a large number of users, using a Bloom filter for this purpose is much faster than a brute force look-up method. The indication of uniqueness amongst user actions provides a valuable tool for advertising/marketing campaign designers, as well as producers of other media content. It allows them to gain an understanding of how many different people have accessed the content. When the number of unique accesses along with the number of total accesses is available, it gives insight into how many unique visits, and how many repeat visits to content have occurred. This information is important for customization of system responses. Systems can respond differently to first time users. Additionally, campaign designers can identify effective campaigns based on the number of unique and total accesses within very large scale systems with many millions of users.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for tracking a usage of an online feature, comprising:
   distributing a key to a plurality of users;
   creating a Bloom filter configured to receive the key for a single online feature by selecting a plurality of different hash functions based on the key;
   identifying utilization of the single online function by unique users by ANDing, for each instance in which any of the plurality of users utilizes the single online feature, results of a hash of the key by each of the plurality of different hash functions in the Bloom filter and updating, in response to an indication of a negative activation, a hash table value corresponding to a hash function that returned a logical 0 result;
   using the Bloom filter, in isolation from other Bloom filters, to probabilistically determine a subset of users included in the plurality of users that have utilized the online feature based on a negative activation of the Bloom filter in response to the key;
   determining a false positive rate for the Bloom filter; and
   creating a new Bloom filter that is associated with the single online feature, wherein the new Bloom filter contains an increased number of Hash functions in the false positive rate exceeding a predetermined threshold.

2. The method of claim 1, further comprising:
   associating a Bloom filter duration with an online feature duration,
   wherein the creating of the new Bloom filter is performed in response to an expiration of the Bloom filter duration.

3. The method of claim 1, further comprising:
   sending a first message to a plurality of users based on a negative activation of the Bloom filter in response to the key, and
   sending a second message to a plurality of users based on a positive activation of the Bloom filter in response to the key.

4. The method of claim 1, wherein a different Bloom filter is associated with each of a plurality of user actions, and wherein the plurality of different hash functions in a Bloom filter include a Foler-N-Vull hash function, a Jenkins hash function, and a Pearson hash function.

5. The method of claim 4, wherein the plurality of user actions includes selecting a link within an email message.

6. The method of claim 4, wherein the plurality of user actions includes downloading a document from a website.

7. The method of claim 4, wherein the plurality of user actions includes making a purchase.

8. The method of claim 4, further comprising:
   recording a count of unique invocations; and
   creating a report including the count of unique invocations.

9. The method of claim 4, wherein the plurality of users ranges from 10 million users to 100 million users.

10. A system for tracking a usage of an online feature, comprising:
    a Bloom filter server, the Bloom filter server comprising:
       a processor;
       a memory coupled to the processor, wherein the memory contains instructions, that when executed by the processor, perform the steps of:
          distributing a key to a plurality of users;
          creating a Bloom filter configured to receive the key for a single online feature by selecting a plurality of different hash functions based on the key;
          identify utilization of the single online function by unique users by ANDing, for each instance in which any of the plurality of users utilizes the single online feature, results of a hash of the key by each of the plurality of different hash functions in the Bloom filter and updating, in response to an indication of a negative activation, a hash table value corresponding to a hash function that returned a logical 0 result;
          using the Bloom filter, in isolation from other Bloom filters, to probabilistically determine a subset of users included in the plurality of users that have utilized the online feature based on a negative activation of the Bloom filter in response to the key;
          determining a false positive rate for the Bloom filter; and
          creating a new Bloom filter that is associated with the single online feature, wherein the new Bloom filter contains an increased number of Hash functions in the false positive rate exceeding a predetermined threshold.

11. The system of claim 10, wherein the memory further contains instructions, that when executed by the processor, perform the steps of:
    associating a Bloom filter duration with an online feature duration; and
    wherein the creating of the new Bloom filter is performed in response to an expiration of the Bloom filter duration.

12. The system of claim 10, wherein the memory further contains instructions, that when executed by the processor, perform the steps of:
    sending a first message to a plurality of users based on a negative activation of the Bloom filter in response to the key, and
    sending a second message to a plurality of users based on a positive activation of the Bloom filter in response to the key.

13. The system of claim 10, wherein the memory further contains instructions, that when executed by the processor, perform the step of associating a different Bloom filter with each of a plurality of user actions, wherein the plurality of different hash functions in a Bloom filter include a Foler-N-Vull hash function, a Jenkins hash function, and a Pearson hash function.

14. The system of claim 13, wherein the plurality of user actions includes selecting a link on a website.

15. The system of claim 13, wherein the plurality of user actions includes downloading a document from a website.

16. The system of claim 13, wherein the plurality of user actions includes opening an application.

17. The system of claim 10, wherein the memory further contains instructions, that when executed by the processor, perform the steps of:

recording a count of unique invocations; and creating a report including the count of unique invocations.

18. A computer program product for tracking a usage of an online feature, comprising a computer readable storage device having program instructions embodied therewith, the program instructions executable by a processor to cause the electronic device to:

distribute a key to a plurality of users;

create a Bloom filter configured to receive the key for a single online feature by selecting a plurality of different hash functions based on the key;

identify utilization of the single online function by unique users by ANDing, for each instance in which any of the plurality of users utilizes the single online feature, results of a hash of the key by each of the plurality of different hash functions in the Bloom filter and updating, in response to an indication of a negative activation, a hash table value corresponding to a hash function that returned a logical 0 result;

utilize the Bloom filter, in isolation from other Bloom filters, to probabilistically determine a subset of users included in the plurality of users that have utilized the online feature based on a negative activation of the Bloom filter in response to the key;

determine a false positive rate for the Bloom filter; and create a new Bloom filter that is associated with the single online feature, wherein the new Bloom filter contains an increased number of Hash functions in the false positive rate exceeding a predetermined threshold.

19. The computer program product of claim 18, wherein the computer readable storage medium further comprises program instructions executable by the processor to cause the electronic device to:

send a first message to a plurality of users based on a negative activation of the Bloom filter in response to the key, and send a second message to a plurality of users based on a positive activation of the Bloom filter in response to the key.

20. The computer program product of claim 18, wherein the computer readable storage medium further comprises program instructions executable by the processor to cause the electronic device to:

record a count of unique invocations; and create a report including the count of unique invocations.

* * * * *